(12) United States Patent
Zätterqvist

(10) Patent No.: US 6,539,833 B1
(45) Date of Patent: Apr. 1, 2003

(54) DROPPING DEVICE

(75) Inventor: Christer Zätterqvist, Uppsala (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 09/857,427

(22) PCT Filed: Nov. 30, 1999

(86) PCT No.: PCT/SE99/02222
§ 371 (c)(1),
(2), (4) Date: Aug. 27, 2001

(87) PCT Pub. No.: WO00/33016
PCT Pub. Date: Jun. 8, 2000

(30) Foreign Application Priority Data

Dec. 2, 1998 (SE) .............................................. 9804156

(51) Int. Cl.⁷ ................................................ B64D 1/04
(52) U.S. Cl. ........................... 89/1.51; 89/1.59; 89/1.11; 221/222; 221/226
(58) Field of Search ................. 89/1.51, 1.58, 89/1.59, 1.11; 221/222, 226

(56) References Cited

U.S. PATENT DOCUMENTS

| | | | | |
|---|---|---|---|---|
| 1,310,053 A | * | 7/1919 | Brower | 109/20 |
| 3,455,484 A | * | 7/1969 | Edwards | 221/222 |
| 3,674,174 A | * | 7/1972 | Crewe | 102/342 |
| 4,374,494 A | * | 2/1983 | Maury | 102/351 |
| 4,397,433 A | * | 8/1983 | Guitaut et al. | 244/118.1 |
| 4,650,092 A | * | 3/1987 | Andersson et al. | 221/222 |
| 5,018,249 A | * | 5/1991 | Andersson et al. | 221/222 |
| 5,052,270 A | * | 10/1991 | Travor et al. | 244/137.4 |
| 5,063,823 A | * | 11/1991 | Marshall et al. | 244/137.1 |
| 5,271,523 A | * | 12/1993 | Nasvall et al. | 221/185 |
| 5,602,362 A | * | 2/1997 | Billard et al. | 102/342 |

FOREIGN PATENT DOCUMENTS

GB   846579   *  8/1960

* cited by examiner

Primary Examiner—Michael J. Carone
Assistant Examiner—Gabriel S Sukman
(74) Attorney, Agent, or Firm—Connolly Bove Lodge & Hutz LLP; Larry J. Hume

(57) ABSTRACT

The present invention relates to a dropping device, preferably borne by a carrier aircraft, for distributing interference medium and especially electronic raspberry. The device according to the invention represents in principle an improvement to the device known through SE 8302508-0 and it is characterized firstly in that it has been provided with separately rotatable accelerator shafts (14, 15), which have the dual function firstly of acting as locks for an unwanted feed-out of interference medium packs (4) and secondly, when a feed-out has been activated, of executing this and giving the fed-out interference medium pack (4') an increased feed-out speed, partly due to the device having been provided with a totally new, specially configured indexing mechanism.

11 Claims, 4 Drawing Sheets

Figure 1:
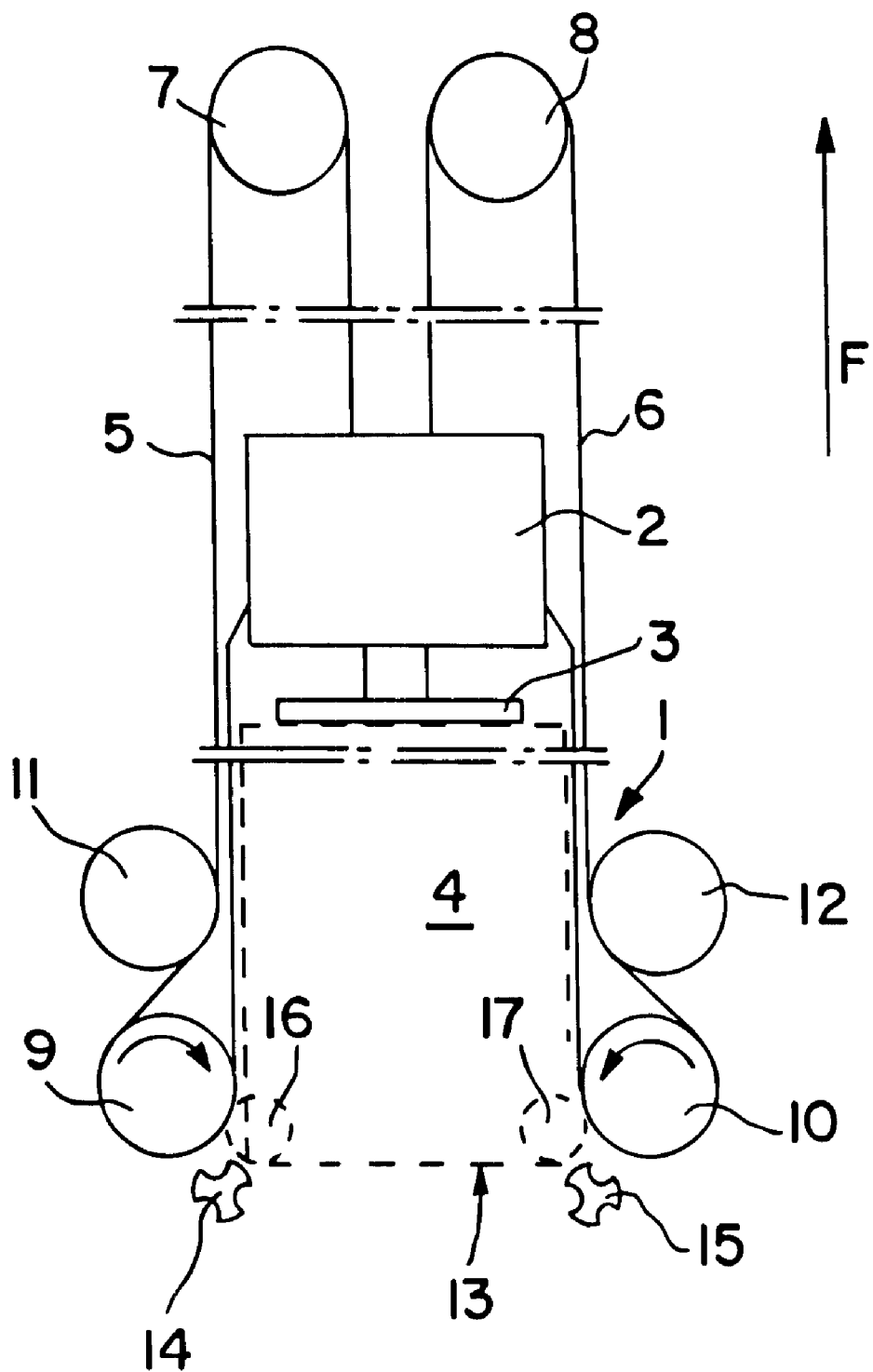

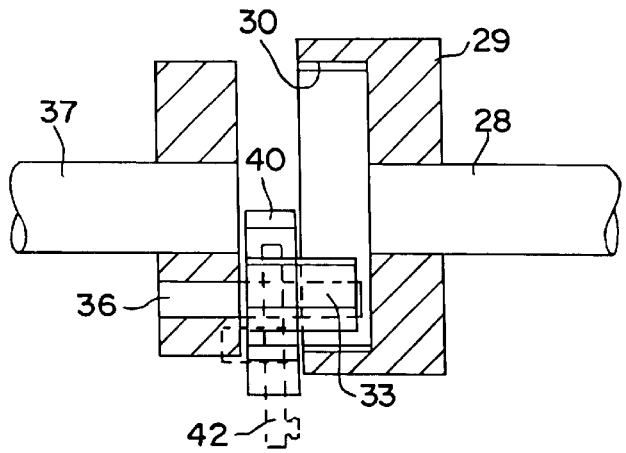
FIG. 5
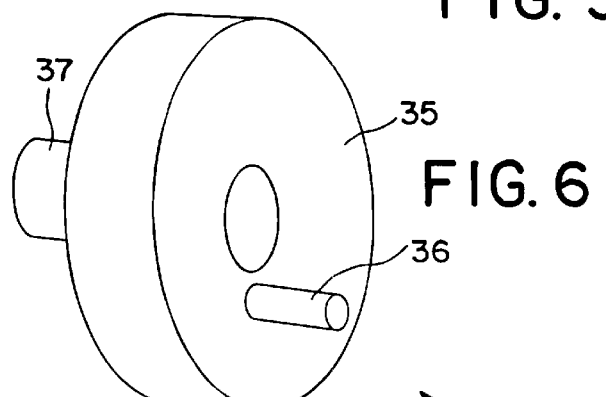
FIG. 6
FIG. 7
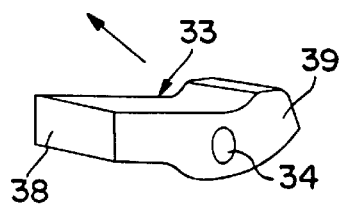
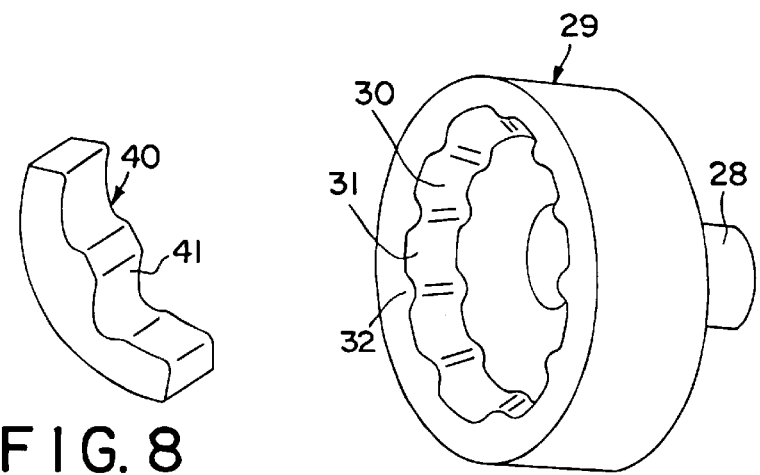
FIG. 8
FIG. 9

DROPPING DEVICE

The present invention relates to a dropping device, preferably borne by a carrier aircraft, for distributing interference medium and especially electronic raspberry and interference medium with infrared (IR) signature, comprising a magazine provided with a rear feed-out opening viewed in the flight direction of the carrier aircraft and a number of packs of interference medium which are arranged one behind the other in the magazine and can be fed out on command, one-by-one through the feed-out opening, by a feed-out device forming part of the said magazine.

The basic principles for such a dropping device are previously known through, for example, SE B 8302508-0, whilst various types of interference medium packs suited thereto are described in EP 0 278 568 and SE B 505 070.

The dropping device described in SE B 8302508-0 is also therefore included, in which a magazine provided with a rear fed-out opening viewed in the flight direction of the carrier aircraft and within which packs of interference medium, arranged one behind the other, can be fed rearwards step-by-step towards and out of the feed-out opening by a feed ram driven by two parallel-running drive belts fastened to the front and rear edge of the ram, which drive belts firstly run along opposite sides of the magazine, on both sides of the packs of interference medium disposed therein, and secondly run back over diverting wheels disposed in the front and rear part respectively of the magazine, whereby they form closed loops. The said front diverting wheels are further joined by gearwheels one to another and to the motor which drives the whole of the feed-out system. The rear diverting wheels are then driven, in turn, by the feed belts. Level with the feed-out opening, special gearwheels are disposed on the same shafts as the rear diverting wheels and driven parallel with these, which special gearwheels, by interacting with toothed members on the packs, firstly, as long as they are stationary, act as stop catches for the rearmost packing and secondly, when rotated by a feed step, act as feed-out members for the same pack and finally, in connection with the feed-out of the rearmost pack, also separate the latter from the following pack with which in the original position it is meant to be coupled.

The above-described device has been widely used within a number of airforces throughout the world and has there proved both reliable and functional. A potential risk which has recently been observed is however that if both drive belts fail then the dropping device could in this realization end up releasing its entire load of packs of interference-suppression medium in a single sweep and this also without command. This theoretical possibility is in fact built into the system, since it is the gearwheels which act as both locks and feed-out members and these will be totally without both locking and driving function in the event of a double belt rupture. Like most other constructions which exist, neither is the device according to SE B 8302508-0 so good that it cannot also be improved and the present invention now relates to a modified variant of this device, which firstly provides a higher feed-out speed for the packs in question and secondly comprises a new indexing or drive function for the feed belts, i.e. de facto the feed ram and the packs of interference medium. In its new modified variant, the device also has the advantage that no feed-out whatsoever can occur unless the drive motor of the dropping device is working.

The higher feed-out speed for the packs of interference medium has been achieved according to the invention by the fact that the gearwheels of the older construction which co-rotate with the feed belts have been replaced by accelerator shafts or cam shafts which are arranged separately mounted in the side edges of the magazine feed-out opening and which, though parallel with the rear diverting wheel shafts of the drive belts, have had their motion stepped up by a number of whole multiples relative to the said diverting wheel shafts and are provided with the same number of brake and separation/acceleration cams which corresponds to that part of a turn by which it has to rotate in order to execute a feed-out of a pack of interference medium.

The accelerator shafts or cam shafts are configured with brake and separation/acceleration cams, which have the function firstly of blocking the feed-out of packs when no feed-out is to occur and secondly of exposing the feed-out opening when the feed-out is started and additionally of separating the outermost pack from its original detachable union with the next pack and finally of giving the outermost pack a final accelerating shove away from the dropping device.

As indicated previously, the feed-out device according to the invention also comprises a safety function which prevents any form of involuntary feed-out of interference medium packs after a drive belt rupture. This safety function has been achieved by the accelerator shafts in the flight direction of the carrier being made self-locking with respect to the interference medium packs. In the rest position of the device, the outermost interference medium pack in the feed-out direction will in fact always come to bear with its feed lugs disposed on both sides of the same against part-cylindrical locking surfaces on the accelerator shafts. These locking surfaces in turn constitute the outer periphery of one or other of the cams of the respective accelerator shaft. Between these part-cylindrical locking surfaces the accelerator shafts are then provided with their special feed grooves, which, when the accelerator shaft is rotated by the dedicated drive function, enter into engagement with the feed lug on the interference medium pack which is next in line to be fed out.

The dropping device according to the invention also requires a reliable indexing mechanism. The indexing mechanism which has now been developed for the dropping device according to the invention has a number of advantages which make it particularly well suited for use under the conditions for which the dropping device is intended and the special stresses to which it might herein be exposed, yet the indexing mechanism in question is also at the same time more universally applicable, for example in automatic packaging machines and other devices requiring a reliable, step-by-step and continually repeated feed function.

The indexing mechanism in question is thus dynamically balanced, which makes it independent of external vibrational and gravitational influence, which is essential when it is a question of parts belonging to modern combat aircraft. It further requires very little space to transmit high torques. It has high repeatability and, by virtue of the fact that indexing is effected through mechanical connection of in principle a single part, its indexing is independent of the friction for force/torque transmission.

The working of the indexing mechanism in question incorporates the feature that one or more turns of the rotation of an input shaft is/are relayed as indexing to a second output shaft. By choosing the number of turns which are required to be extracted from the output shaft, a number of different indexings can therefore be obtained. This gives the indexing mechanism in question a very high degree of flexibility.

The step-by-step feeding or indexing is thus achieved according to the invention by mechanical connection between a rotary input motor shaft and a driver, which is in turn is connected to a second output shaft, which is in line with the motor shaft but totally detached therefrom, and this second output shaft, following connection, imitating the rotation of the motor shaft for one or more full turns, wholly dependent upon the setting, so as thereafter to be disconnected and braked with immediate effect. According to a preferred embodiment of this system, the motor shaft is directly connected to a cylindrical drive drum arranged concentrically about the same, which drive drum is provided internally with a fluting in the form of grooves or cavities against which a driver which is adjustable between two different positions can be connected and disconnected. In its normal position, the driver, which is thus connected to the second output shaft, is held by an eccentric in engagement with a system-fixed stop lug. As soon as the eccentric is readjusted so that its influence upon the driver ceases, the driver will enter into engagement position against the flutes of the drive drum and will accompany the latter for one or more full turns so as, as soon as the latter re-establishes contact with the eccentric, to be disconnected from the drive drum and with its opposite end enter into engagement with the stop lug, whereupon the stop lug itself and the output shaft are simultaneously sharply braked. The sole control function which is required in this system, over and above the purely mechanical control of the connection and disconnection of the eccentric, is a delay between the activation command and the connection of the driver, which gives the motor time to reach full speed before the driver is coupled together with the drive drum. In those cases in which the drive motor is always switched on, there is obviously no need for any delay whatsoever. It is additionally required that the eccentric shall have been returned to its original position before the driver has completed the intended number of turns.

The driver which is characteristic of the device according to the invention is mounted tiltably about a crankshaft arranged parallel with the output shaft and somewhat eccentrically relative to the same, whilst the driver itself extends at a tangent transversely to this shaft, about which it is tiltable between its two working positions, i.e. alternatively with its end edge facing towards the rotational direction of the motor and in bearing contact against the fluted inner side of the drive drum or with its end edge facing in the rotational direction of the motor and in bearing contact against the fixedly disposed brake lug. In order to tilt over the driver from its position in bearing contact against the fluted inner side of the drive drum, in which position it can be held by, for example, a spring, into its other locked position in which its other end bears against the brake lug, the aforementioned mechanically adjustable eccentric, disposed in a fixed mounting directly beyond the outer edge of the drive drum, can preferably be used, by means of which the driver can be forced over into its other position. For this, the eccentric quite simply lifts the particular end of the driver out of its engagement with the fluting of the drive drum, whereupon the front end of the driver in the rotational direction encounters the stop lug. The fact that the eccentric has a fixedly disposed mounting and the drive drum and the driver, when the latter is connected, rotate about the shafts in question, means that the driver and the eccentric have one contact possibility per turn.

The invention has been defined in the subsequent patent claims and in which it should be noted that the indexing mechanism to which reference has previously been made can also be used in connection with other devices in which a similar step-by-step operation is desirable.

Figure 2:
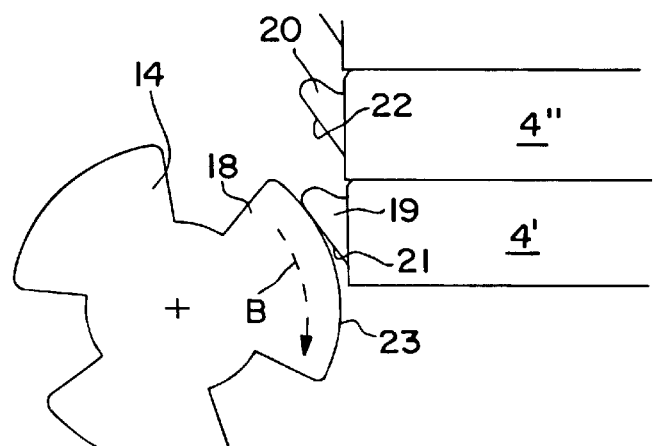
Figure 3:
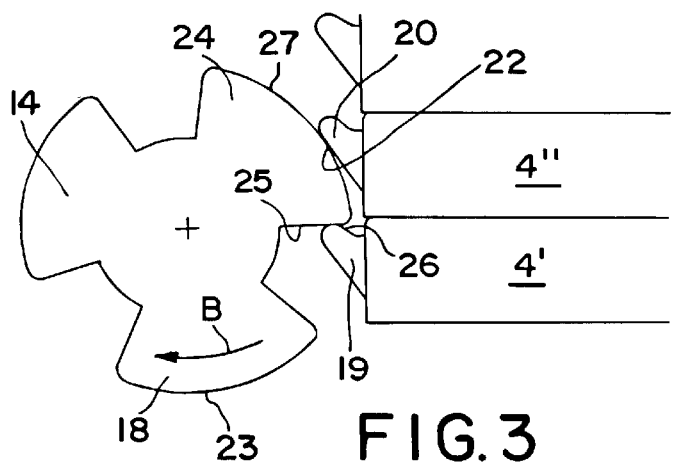
Figure 4:
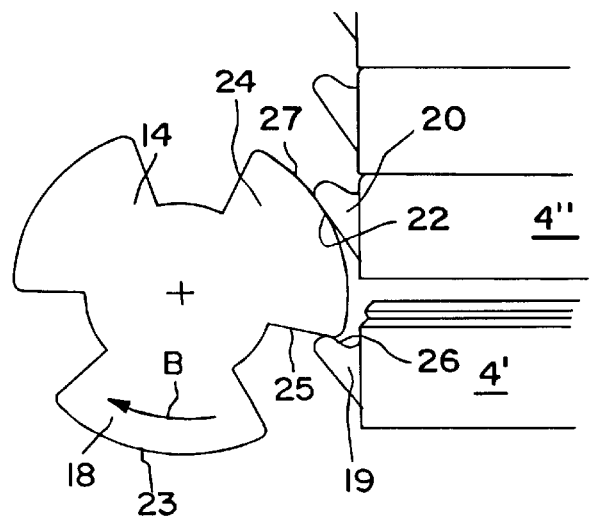
Figure 10:
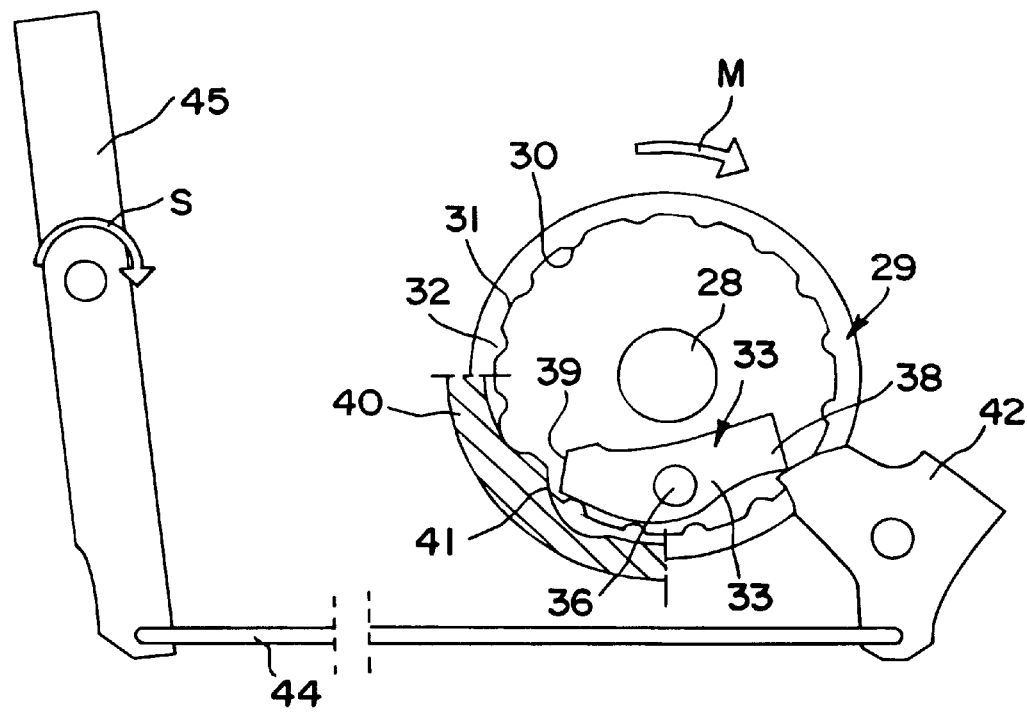
Figure 11:
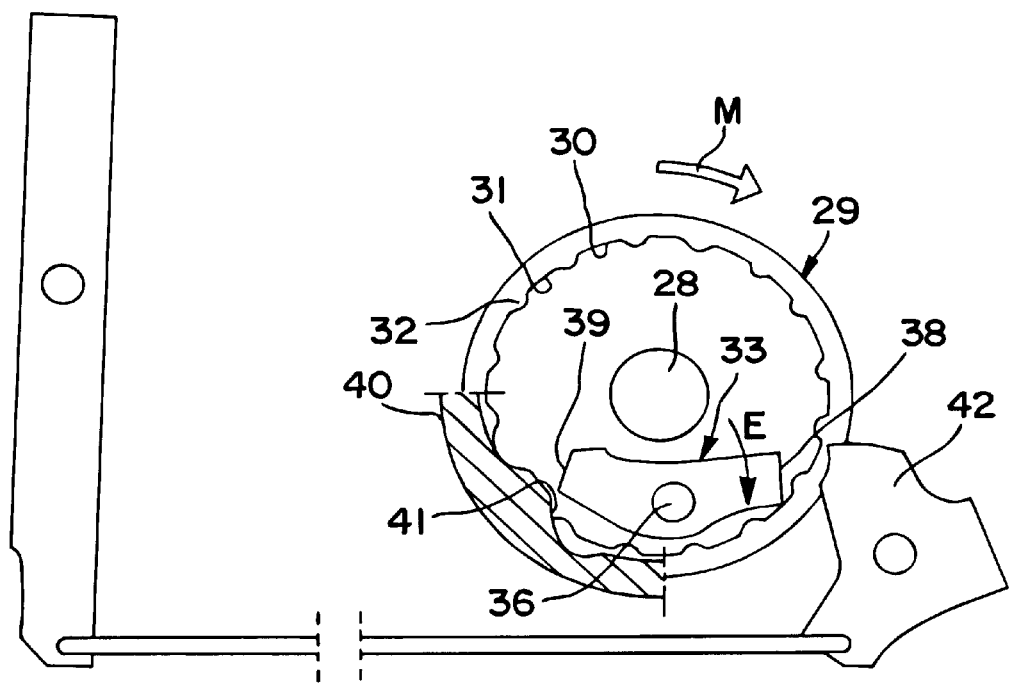

The invention shall now be somewhat further described in connection with the appended drawings, in which:

FIG. 1 shows the basic principles for the dropping device according to the invention FIGS. 2–4 shows in larger scale a detailed picture of the feed-out function FIG. 5 shows a section through the indexing function FIGS. 6–9 shows the main parts of the indexing function and FIG. 10 shows the main parts of the indexing function in braked position, and FIG. 11 shows the main parts of the indexing function once indexing has started.

As can be seen from FIG. 1, the basic layout for the dropping device according to the invention thus comprises a magazine 1 in which there is disposed a displaceable feed ram 2 provided with an integrated resilient front ram plate 3. In the direction of feed of the ram, ahead of the same, there are a number of packs 4 of interference medium. The packs are in the magazine preferably coupled together to form a unit, but they can relatively easily be disconnected from one another. The motion of the feed ram 2 is controlled and directed by two feed belts 5,6, one on each side of the magazine. The feed belts 5,6 are fixed at their ends in the front and rear edge respectively of the ram and the belt loops which are thus obtained run over diverting rollers 7,8 and 9,10 disposed in the front and rear edge respectively of the dropping device. Two tensioning rollers 11,12 are also included. The rear diverting rollers 9,10 in the flight direction of the carrier are connected to an indexing function, by means of which the feed belts 5,6 and hence also the ram 2 and the packs 4 can be displaced within and out of the magazine. In the rear edge of the dropping device, this is configured with a feed-out opening 13. The flight direction of the carrier aircraft is indicated in the figure by the arrow F. The feeding of the packs 4 within the magazine is therefore effected rearwards in the flight direction.

On each side of the feed-out opening 13 of the magazine 1 there are additionally found accelerator shafts or cam shafts 14, 15, which, via gear units 16, 17, are driven by the diverting rollers 9,10 but at higher speed.

In a dropping device configured according to the example shown, $\frac{1}{12}$ of a turn is required on the diverting rollers 9,10 to feed out a pack of interference material. At the same time the accelerator shafts or cam shafts 14,15 pass through ⅓ of a turn, i.e. at a speed which is 4 times as high.

The working of the accelerator shafts or cam shafts 14,15 can be seen from FIGS. 2–4, of which FIG. 2 shows the starting position in which the first cam 18 of the cam shaft 14 blocks the feed-out of the containers 4' and 4". As can be seen from FIGS. 2–4, the containers 4' and 4" are provided with special feed-out lugs 19 and 20 having flanks 21 and 22 which are obliquely bevelled rearwards in the feed-out direction. In its locked stop position, the outermost pack 4' bears with the obliquely bevelled flank 21 of its stop lug 19 against the part-cylindrical outer periphery 23 of the accelerator shaft or cam shaft 14. In this position, the device is therefore locked in self-locking arrangement. When the cam shaft 14 starts to move in the direction of the arrow B, the cam 18 first allows the pack 4' to move forward in that its feed lug 19 can enter into the space between the first cam 18 of the cam shaft 14 and its second cam 24, whereafter the front edge 25 of the cam 24 enters into engagement with the top corner 26 of the feed lug 19 at the same time as its part-cylindrical flank 27 stops the feed lug 20 of the container 4" in that the obliquely bevelled flank 22 of the said feed lug comes to bear against the same. The result is that the container 4" is stopped at the same time as the container 4' is prized loose from the same and is given an extra shove in the feed-out direction, which is flown per se in FIG. 4, after which the accelerator shaft or cam shaft 14 is sharply braked in the position shown in FIG. 2 but with the cam 24 as the braking cam and with the container 4" in the position for the next feed-out.

The cam shafts 14,15 thus operate at the same time as the entire quantity of packs 4 is fed towards the feed-out opening 13 (see FIG. 1) but the cam shafts operate considerably faster. The specific configuration of the cam shafts 14 and 15 with the part-cylindrical flanks 27 of the feed cams and the interaction of these flanks with the feed lugs 19,20 of the packs 4 have allowed the drive system to be given self-locking properties.

Compared with an older dropping device configured according to SE B 8302508-0, the feed-out speed has been able in principle to be doubled, which is vitally important since this provides a considerably faster distribution of the interference medium in the pack.

In order to enable the above-described device to work perfectly satisfactorily, there is a need for very precise indexing or advancement by the diverting wheels 9,10, from which all functions emanate by virtue of the fact that they are coupled there via direct-acting gear units.

The indexing mechanism referred to here shall now be described in greater detail in connection with FIGS. 5–11.

Directly connected to the drive shaft 28 for an electric motor there is a drive drum 29. This has an internal cylindrical surface 30 provided with a considerable number of "cavities" 31 separated by banks 32.

Also forming part of the indexing mechanism is a driver 33, which is connected via a continuous shaft hole 34 to a driver disc 35 by a cylindrical shaft 36 secured in the latter. The driver disc 35 has an output shaft 37, which lies in line with the shaft 28 but which is detached therefrom. The driver 33 has a drive edge 38, which, in the mounted state, faces towards the cavities 31 of the drive drum 29, and a brake edge 39 facing in the opposite direction.

Between the drive drum 29 and the driver disc 35 there is further disposed an immovable brake calliper 40. As can be seen from FIG. 10, this has a brake lug 41 against which the driver 33 can be brought to bear by an eccentric 42 likewise disposed between the drive drum 29 and the driver disc 35. The driver 33 is provided internally with a spring (not visible in the figures), which endeavours to rotate it about the shaft 36 in the direction of the arrow E.

The eccentric 42 is adjustable by means of a link 44 and a control lever 45 between the original rest position shown in FIG. 10 and the start position shown in FIG. 11.

Whenever a container of interference medium is fed out, the motor which drives the feed drum 29 is started and once the motor has reached full working speed in the direction of the arrow M the control lever 45 is actuated in the direction of the arrow S, whereupon the eccentric 42 releases its grip against the driver 33, the drive edge 38 of the latter being brought by the spring (not shown in the figure) into contact with the nearest cavity/cam 31/32 in the drive drum 29 and the driver 33 taking the driver disc 35 and the shaft 37 along with it in its hereupon commenced rotary motion. As soon as the eccentric 42 has let the driver 33 pass, it will be returned to its original position if indexing of just one turn is required, which means that as soon as the driver 33 has completed a turn it will slide up onto the eccentric 42 and will hence be disconnected from the drive drum 29 at the same time as its brake edge 39 is brought to bear against the brake edge 41 of the brake calliper 40 which produces a direct rotational halt for the shaft 37.

This device thus provides very precise indexing which always yields one or more full feed turns. This precise indexing in the form of one or more feed turns can then be converted via a direct-acting gear unit to any form of desired feed motion which is required for each individual function.

I claim:

1. An airborne dropping device for distributing interference medium including electronic raspberry and interference medium having an infrared (IR) signature, the dropping device comprising:

a magazine having a feed-out opening directed rearwards with respect to a motional direction of the dropping device, wherein a plurality of packs of the interference medium are arranged sequentially within the magazine; and a feed device comprising rotary members which, on receipt of a feed command, stepwise feeds each of the plurality of packs of interference medium towards the feed-out opening, said rotary members each including a camshaft, wherein a number of stop positions of the camshaft is equal to a number of cams on the camshaft, wherein, when the camshaft is in one of the stop positions, a radial outer periphery of one of the cams acts as a stop for feed-out of a next interference medium pack, wherein, when the camshaft is in motion, a front flank of said one of the cams, in a motional direction of the camshaft, acts both as a separation member between successive interference medium packs and as an acceleration member for a front interference medium pack when the front interference medium pack leaves the feed-out opening, wherein each camshaft is arranged parallel-driven along at least two opposite side edges of the feed-out opening, wherein the camshaft included in each of the rotary members is mechanically coupled at least through an intermediate gear unit to a belt-driven gear train, said mechanical coupling preventing an uncontrolled exit of the next interference medium pack from the feed-out opening when a belt in the belt-driven gear train is broken, and wherein a motion of each of the camshafts is stepped up by a number of whole multiples relative to the motion of the feed device.

2. The airborne dropping device of claim 1, wherein the feed device further comprises:

a feed ram driven by two parallel-running running drive belts fastened at respective ends thereof to a front and rear edge of the ram, wherein said parallel-running drive belts run first along respective sides of the plurality of packs of interference medium and, second, run back over respective plural diverting wheels disposed in a front and rear part of the magazine, respectively, wherein the rear diverting wheels are driven by the drive belts which, on receipt of said feed command, produces a stepwise feeding of the ram and the plurality of packs of interference medium, wherein the rear diverting wheels are further coupled by the intermediate gear unit to a respective camshaft, wherein the number of cams n on the respective camshaft is n>1, and a feed-out of the next pack of interference medium results from a 1/n fractional turn of the camshaft.

3. The airborne dropping device of claim 2, wherein n=3 and each of said three cams has said radial outer periphery, wherein, when the camshaft is in any one of said stop positions, an associated one of the three cams locks a feed-out of any additional packs of interference medium, wherein, when the camshaft is in motion, an associated front flank edge in said motional direction of the camshaft first separates the front interference medium pack from the next interference medium pack, and then accelerates the feed-out of said front interference medium pack.

4. The airborne dropping device of claim 1, wherein the stepwise feeding of each of the plurality of packs of interference medium by the feed device is accomplished by a mechanical connection, the mechanical connection comprising:

a motor having a motor shaft connected thereto;

a drive drum having an inner periphery containing grooves thereon, wherein the drive drum is concentrically arranged around the motor shaft and is driven by the motor shaft;

a driver which contacts at least one of the grooves on the inner periphery of the drive drum, wherein the driver is removed from contact with the grooves after a full turn of the motor shaft; and a second indexing shaft arranged axially and concentrically about the motor shaft along an extension of the motor shaft, the second indexing shaft being coupled to the driver and completely detached from the motor shaft, wherein a rotation of the second indexing shaft is used to drive the feed-out of the packs of interference medium.

5. An airborne dropping device for distributing interference medium including electronic raspberry and interference medium having an infrared (IR) signature, the dropping device comprising:

a magazine having a feed-out opening directed rearwards with respect to a motional direction of the dropping device, wherein a plurality of packs of the interference medium are arranged sequentially within the magazine; and a feed device comprising rotary members which, on receipt of a feed command, stepwise feeds each of the plurality of packs of interference medium towards the feed-out opening, said rotary members each including a camshaft, wherein a number of stop positions of the camshaft is equal to a number of cams on the camshaft, wherein, when the camshaft is in one of the stop positions, a radial outer periphery of one of the cams acts as a stop for feed-out of a next interference medium pack, wherein, when the camshaft is in motion, a front flank of said one of the cams, in a motional direction of the camshaft, acts both as a separation member between successive interference medium packs and as an acceleration member for a front interference medium pack when the front interference medium pack leaves the feed-out opening, wherein the camshaft included in each of the rotary members is mechanically coupled to the feed device of the magazine and is arranged parallel-driven along at least two opposite side edges of the feed-out opening, wherein a motion of each of the camshafts is stepped up by a number of whole multiples relative to the motion of the feed device, wherein the stepwise feeding of said ram and the plurality of packs of interference medium by the feed device is accomplished by a mechanical connection including a motor having a motor shaft connected thereto;

a drive drum having an inner periphery containing grooves thereon, wherein the drive drum is concentrically arranged around the motor shaft and is driven by the motor shaft;

a driver which contacts at least one of the grooves on the inner periphery of the drive drum, wherein the driver is removed from contact with the grooves after a full turn of the motor shaft; and a second indexing shaft arranged axially and concentrically about the motor shaft along an extension of the motor shaft, the second indexing shaft being coupled to the driver and completely detached from the motor shaft, wherein a rotation of the second indexing shaft is used to drive the feed-out of the packs of interference medium, wherein, between the drive drum and the output shaft to which the driver is connected is a space in which a fixed stop lug for the driver and an eccentric movable about a fixed shaft are disposed, said eccentric being arranged to transfer the driver from a first locking position, in which said driver bears with one end edge thereof against the stop lug, into a second active position in which a portion of the driver protruding into the drive drum is connected against the at least one of the grooves on the inner periphery of the drive drum.

6. The airborne dropping device of claim 5, further comprising:

a control command system that starts the motor and drives the drive drum when an order is given for the launch of one of the plurality of interference medium packs, wherein, after the motor has reached an operational speed, the control command system connects the driver to the inner periphery of the drive drum via the eccentric, wherein the eccentric is returned to a starting position after connection of the driver to the inner periphery, wherein, after one rotation of the driver, the eccentric reconnects the driver to the inner periphery of the drive drum at a different position on the inner periphery.

7. The airborne dropping device of claim 2, wherein the stepwise feeding of said feed ram and the plurality of packs of interference medium by the rear diverting wheels and the camshafts is accomplished by a mechanical connection, the mechanical connection comprising:

a motor having a motor shaft connected thereto;

a drive drum having an inner periphery containing grooves thereon, wherein the drive drum is concentrically arranged around the motor shaft and is driven by the motor shaft;

a driver which contacts at least one of the grooves on the inner periphery of the drive drum, wherein the driver is removed from contact with the grooves after a full turn of the motor shaft; and a second indexing shaft arranged axially and concentrically about the motor shaft along an extension of the motor shaft, the second indexing shaft being coupled to the driver and completely detached from the motor shaft, wherein a rotation of the second indexing shaft is used to drive the feed-out of the packs of interference medium.

8. Dropping device according to claim 3, wherein the stepwise feeding of said feed ram and the plurality of packs of interference medium by the rear diverting wheels and the camshafts is accomplished by a mechanical connection, the mechanical connection comprising:

a motor having a motor shaft connected thereto;

a drive drum having an inner periphery containing grooves thereon, wherein the drive drum is concentrically arranged around the motor shaft and is driven by the motor shaft;

a driver which contacts at least one of the grooves on the inner periphery of the drive drum, wherein the driver is removed from contact with the grooves after a full turn of the motor shaft; and a second indexing shaft arranged axially and concentrically about the motor shaft along an extension of the motor shaft, the second indexing shaft being coupled to the driver and completely detached from the motor shaft, wherein a rotation of the second indexing shaft is used to drive the feed-out of the packs of interference medium.

9. A dropping device for distributing an interference medium, the dropping device comprising:

a magazine having a feed-out opening directed rearwards with respect to a motional direction of the dropping device, wherein a plurality of packs of the interference medium are arranged sequentially within the magazine; and feed means including an intermediate gear unit coupled to a belt-driven gear train for stepwise feeding each of the plurality of packs of interference medium towards the feed-out opening, wherein, when the dropping device is in a stop position, the feed means for stepwise feeding stops a feed-out of a next interference medium pack, wherein, when the dropping device is in a feed position, the feed means for stepwise feeding accelerates a front interference medium pack when the front interference medium pack leaves the feed-out opening, and wherein the feed means for stepwise feeding prevents an uncontrolled exit of the next interference medium pack from the feed-out opening when a belt in the belt-driven gear train is broken.

10. The dropping device of claim 9, wherein the feed means includes plural camshafts, wherein a motion of each of the camshafts is stepped up by a number of whole multiples relative to a motion of the feed device.

11. A dropping device for distributing an interference medium, the dropping device comprising:

a magazine having a feed-out opening directed rearwards with respect to a motional direction of the dropping device, wherein a plurality of packs of the interference medium are arranged sequentially within the magazine;

a clutch assembly including a drive drum and an output shaft to which a driver is selectively coupled; and indexing means for controlling the feed-out of the sequentially arranged packs of the interference medium, wherein the indexing means includes a fixed stop lug cooperating with the driver to stop a rotation of the output shaft, and an eccentric movable about a fixed shaft which engages the driver with the drive drum to turn the output shaft and feed a front pack of the interference medium.

* * * * *